D. J. TITTLE.
Machine for Raking Potatoes.

No. 76,851.

Patented April 14, 186

WITNESSES
Alex. Selkirk
George M. Loomis

INVENTOR
Daniel J. Tittle

United States Patent Office.

DANIEL J. TITTLE, OF ALBANY, NEW YORK, ASSIGNOR TO ABBIE M. TITTLE, OF SAME PLACE.

*Letters Patent No. 76,851, dated April 14, 1868.*

---

IMPROVEMENT IN MACHINE FOR RAKING POTATOES.

---

*The Schedule referred to in these Letters Patent and making part of the same.*

---

TO ALL WHOM IT MAY CONCERN:

Be it known that I, DANIEL J. TITTLE, of the city and county of Albany, State of New York, have invented a new and useful Machine for Combing or Raking Potatoes, Turnips, Onions, and similar-shaped vegetable roots from out the soil and depositing them upon the surface; and I do hereby declare that the following is a full, clear, and exact description thereof, reference being had to the accompanying drawings, forming a part of this specification, and the letters of reference marked thereon, in which—

The nature of my invention consists of constructing a comb or rake of a series of teeth placed about one inch apart, more or less, and securing them firmly together in any of the positions shown, and the hole is provided with a single or crotch-beam, by which the machine is drawn. The machine is also provided with handles, whereby it is guided by the person in attendance.

With this machine drawn by one or two horses, potatoes, turnips, onions, and similar-shaped roots are easily and readily combed or raked out of the ground, by the teeth entering and passing through the ground below the roots to be removed, and gently and gradually raising them to the surface, casting them back of the machine free from soil, where they may be readily gathered, or to one or both srues, as may be by the machine used.

To enable others skilled in the art to make and use my invention, I will proceed to describe it with reference to the accompanying drawings and letters marked thereon, the same letters referring to like parts.

Figure 1:
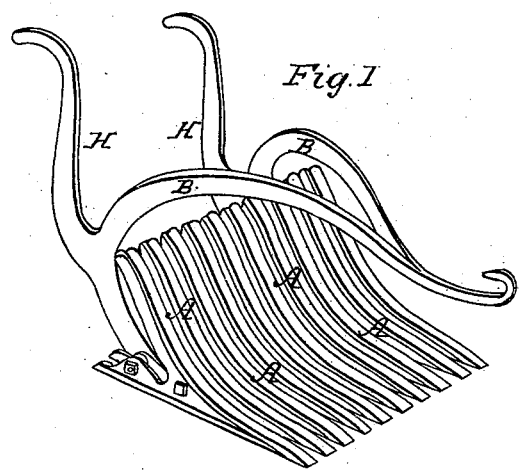
Figure 1 represents a perspective view of machine.
Figure 5:
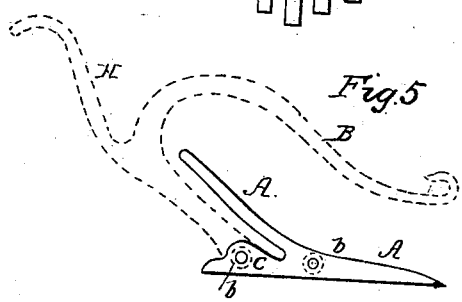
Figure 5 is a cross-section of a tooth.
Figure 6:
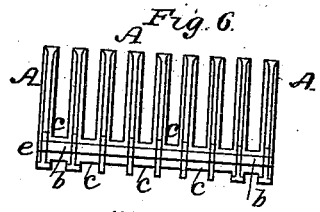
Figure 6 represents a view from back of machine.

The machine represented in the perspective view, fig. 1, is composed of a number (say nine teeth, more or less,) of teeth, A A A, arranged and set about one inch apart, more or less. These teeth, shaped as shown in fig. 5, are about twenty inches long, and may be made of wrought iron, cast iron, malleable iron, steel, or other suitable material.

Figure 2:
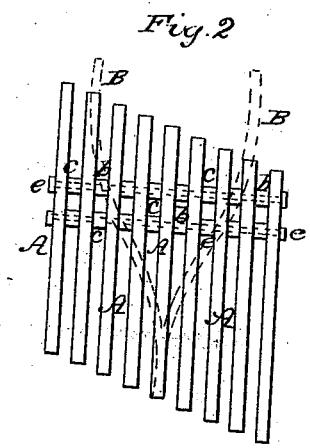
Figure 2 represents a vertical view from top of machine, with teeth set obliquely.
Figure 3:
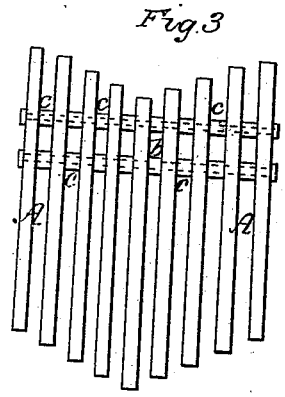
Figure 3 represents a ertical view from top of machine, with teeth set oblique from centre.
Figure 4:
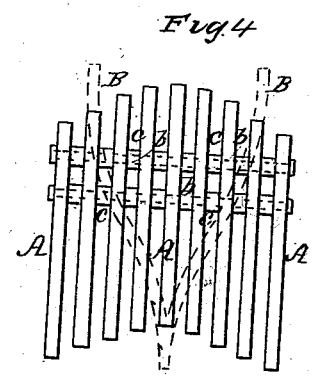
Figure 4 represents a vertical view from top of machine, with teeth set so as to form a convex line of points.

The said teeth may also be set and arranged in positions, as in figs. 2, 3, or 4, to suit the peculiarities of and circumstances connected with the soil to be operated in, and are connected together and held firmly in position by the two bolts $b\ b$, figs. 2, 3, 4, 5, and 6, passing though each and all of the said teeth, at or near their rear ends. These bolts $b\ b$ also run through the shoulder-washers $c\ c\ c$, which are placed between the teeth A A A, to keep them at proper distances apart; and when thus arranged, the whole is tightened by means of the screw-nuts $e\ e$ at the ends of the bolts $b\ b$.

To draw the machine, I furnish a suitable draught-beam, B B, which may be made a crotch-beam, as shown in fig. 1, and by the dotted lines in figs. 2 and 4. The said draught-beam B is connected to one or more of the teeth A, at or near its rear end, near the ground, and back of the upper end of the teeth, as is shown by the dotted line in fig. 5, or they may be cast solid, with the two second teeth from the side. The said draw-beam is also provided with a suitable hook at its front end, to which the double-tree is to be attached. The handles H H, figs. 1 and 2, may be provided by casting them solid to the draw-beam, or may be bolted on or otherwise fastened in a suitable and firm manner.

To use and operate this machine, it is drawn by one or more horses, properly hitched to it by the hook on the end of the beam B, and, as the machine is drawn along, the points of the teeth A A enter the ground below the root to be taken out, and by the constant forward movement the roots are gently and gradually loosened from the soil and raised up. The soil and the dirt at the same time pass through between the teeth A A, while the roots are carried up and over the rear end of the machine, and drop down behind, on the surface of the ground, or are carried wholly or to one side, as by machine, fig. 2, or to both sides, as by machine, fig. 3.

Machines, figs. 1 and 4, are adapted to light loam or sandy soil, while machines, figs. 2 and 3, are adapted to heavier or stony soil, where greater resistance would be offered.

The advantages attending the use of this machine for raising potatoes, onions, turnips, and similar roots from their soil are these:

First. The roots can be raised, freed from the soil, and deposited on the surface of the ground without injury to them.

Second. The necessity of removing the tops or weeds from the ground to be worked in is overcome, as the machine cannot clog with them.

Third. The resistance offered to the horses is less than that offered to a plough or the heavy-gear machines now used.

Fourth. The soil will be thoroughly raked and loosened up to a good depth, and fitted to receive a grain-crop without the necessity of being ploughed.

Having described my invention, what I claim, and desire to secure by Letters Patent, is—

I claim a root-comb or rake, constructed of a number of teeth, A A, of shape shown in fig. 5, arranged in position and secured as described, and operated with a single or crotch-beam, B, or its equivalent, and provided with one or more handles, H H, as set forth and described.

DANIEL J. TITTLE.

Witnesses:
ALEX. SELKIRK,
GEORGE M. LOOMIS.